Nov. 13, 1934.   A. V. SIMS   1,980,833
VALVE
Filed Sept. 16, 1929
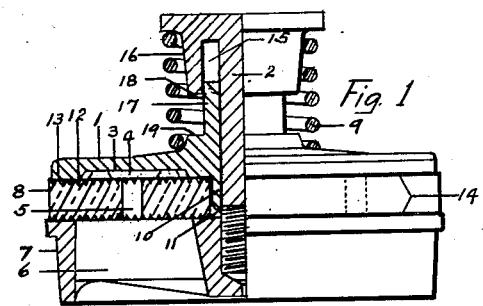
Fig. 1
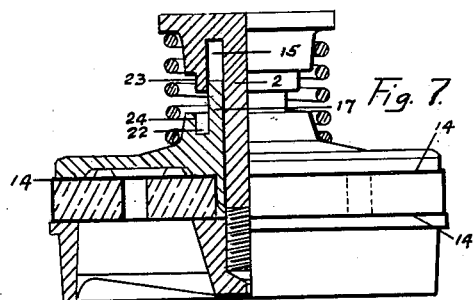
Fig. 7
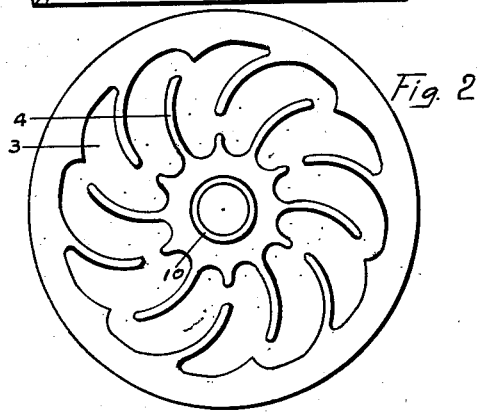
Fig. 2
Fig. 3
Fig. 4
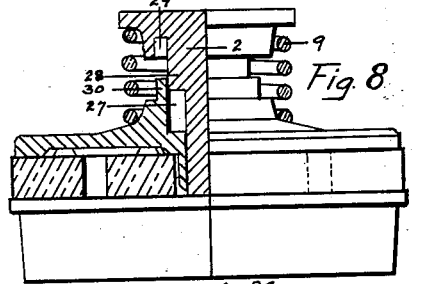
Fig. 8
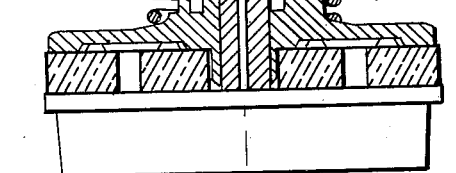
Fig. 9
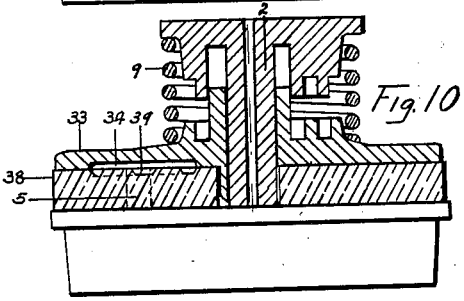
Fig. 10
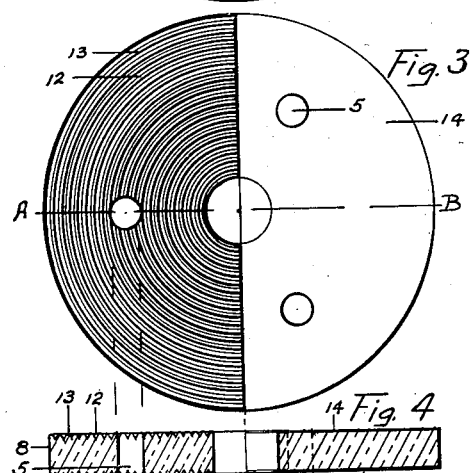
Fig. 5
Fig. 6
Alfred V. Sims, Inventor
By his Attorney
Thomas Howe Patented Nov. 13, 1934

1,980,833

UNITED STATES PATENT OFFICE 1,980,833

VALVE

Alfred Varley Sims, Brooklyn, N. Y.

Application September 16, 1929, Serial No. 392,750

3 Claims. (Cl. 251—146)

My invention relates more particularly to valves for reciprocating pumps, for check valves and the like, but is equally applicable to all valves having reciprocating actions.

Among the objects of my invention are to increase the life of, or conserve, the discs, seats, and other parts of the valve; eliminate cutting and scoring, caused by leakage, of seats, guard plates, or rotators, and discs where they come in contact; eliminate seat-imprinting of the discs by the seats. Among further objects of my invention are to prevent impact, that damages parts of the valves and decreases the speed at which operation can be practically and economically maintained; to decrease or eliminate the destructive effects on discs and seats of sand and grit that may be carried in the fluid pumped; to practically eliminate in reciprocating pumps the "slip" or leakage that is universally progressive with the use of non-rotating valves in reciprocating pumps, thus allowing this class of pumps to maintain indefinitely its superior efficiency.

Reciprocating pumps have always been capable of higher efficiency than any other class of pumps yet devised. The composition discs of their valves invariably become imprinted from contacting in one position on the seats, when inevitably they become turned to new positions and no longer fit closely on the seats, causing serious "slip" or leakage to occur. The longer the same discs are used the worse the seat-imprinting becomes and the greater the loss in efficiency from slip. Losses of 10%, 20% and even 30% and over are frequently encountered, often causing reciprocating pumps to fall in efficiency below centrifugal and other classes of pumps that are innately less efficient. At present, except by the use of mechanisms that will rotate the composition discs with each double stroke or revolution of the pump, this serious loss from slip can only be reduced by stopping the pumps, removing the discs, facing off the seat-imprinting or installing new discs, constituting a serious element of expense of operation of reciprocating pumps, and is their chief cause of decrease in efficiency in normal or usual operation.

Reciprocating pumps encounter many and various conditions of operation that subject the valves to differing heavy stresses. High suction lifts, small or restricted suction pipes, hot or highly volatile liquids pumped, undue speed, or various combinations of such, cause pumps of this class to fail to fill the fluid cylinders on their suction strokes. Then when the pump starts its pressure or discharge stroke the piston or plunger, having slight resistance while it travels through the first portion of its stroke but actuated by the full driving force of the steam or other prime mover, increases its speed, accumulates momentum, and strikes sudden resistance with great force. When this resistance is a liquid it is driven with great force against the under side of the discs of the discharge valves, driving them and their guard plates or rotators against the stem heads. This frequently recurring impact not only batters the parts but crystalizes the stems and causes them to break off, usually at the surface of the seats, making removal of the part left in the seat both difficult and expensive. The parts thus liberated by the broken stems usually go off into the piping system causing considerable expense for their removal and often causing protracted shut-down of plants. Under these conditions of cylinders failing to fill the suction, valves also remain at least partly open until the piston has closed up the vacuous space, condensed any vapor ahead of it and strikes the liquid, when the suction discs are forced violently on the seats, causing destructive water-hammering. My invention overcomes this weakness by the use of a dashpot and dash, or a system of them for severe cases, between the rotators and stem heads. The occurrence of the impact between stem head and the moving parts on the stem is notice to the operator that the speed, and hence the output of the pumps, must be reduced to avoid the breakages and expense described. The impact of the discs and rotators or guard plates, on the seats is greatly lessened through the action of the dashpot and dashes referred to by retarding the closing motion of the rotators or guard plates, thus allowing these two parts to separate slightly and films of fluid to form on the tops of the discs to act as cushions. The dashpots and dashes described, by minimizing or eliminating these troubles, enables the speed of the pumps to be not only maintained but increased.

The device patented by Robotham in February 15, 1910, No. 949,734, for the purpose of rotating the discs of reciprocating valves seems incidentally to illustrate a mechanism that would produce a cushioning effect. This was devised to replace his mechanism patented April 23, 1907, No. 851,182 and any slight cushioning effect produced was incidental, and it will be observed that what corresponds to my dashpot is relieved through a series of port-holes.

Another difficulty met with in reciprocating valves used under high pressure arises from the fact that in such services the discs, to prevent too ready seat-imprinting on the seats, must be made of very hard composition or metal. It is impracticable, particularly when new, to make such discs to fit perfectly fluid tight on the seats. When they are left standing under pressure small hair like or needle like leaks will occur that act to score or cut both discs and seats. After each period of operation, which causes the discs to rotate, they will settle in new positions on the seats, when the scores or cuts already formed in the discs will produce new cuts in the seats, and likewise the cuts formed in the seats will cause new scores or cuts in discs, until the discs and seats must both be taken out and machined to true faces, after which the same eroding process begins anew. When the discs are not regularly rotated by the action of the pump they become seat-imprinted and on becoming moved slightly develop leaks producing the same effects. If the valves are such as to regularly rotate the discs slightly with each cycle of operation of the pump seat-imprinting will be eliminated and this cause of score-producing leakage will not occur. With new hard composition or metal discs this seat and disc scoring and cutting will occur even if the discs are rotated unless the pump can be first kept in constant operation long enough to wear the discs to a fluid tight fit on the seats. But such conditions of long enough continuous operation to effect such a perfect fit are unusual, particularly when the seats have inclined ports as described in my Patent No. 1,523,910, issued Jan. 20, 1925, on which the discs seat so gently as to make wearing extremely slow. My invention overcomes this difficulty by making very thin but more yielding or less resisting surfaces on otherwise hard and strong discs, whether made of metal or composition. It will be appreciated that only fine leaks of very small amplitude or thickness will produce cutting; large leaks will produce such results only to a negligible extent. Therefore the thickness of the layers that are less resisting than the main body of the discs may be, and preferably are, very thin. These layers are not designed to function as would a leather pad riveted to a metal plate, which becomes the wearing surface. The main function of these layers is to wear away evenly and readily on a rotating valve, leaving hard close fitting contacts.

This may be accomplished by the adhesion to the faces of the discs of hard material a thin layer of a more yielding material that will conform to the slight irregularities of the seats and prevent leakage. Any impressions or seat-imprintings caused by the valves standing under pressure would of necessity be shallow, due to the thinness of the yielding layers. When the valve mechanisms rotate their discs these shallow imprintings are at once obliterated when operation of the pump is resumed.

Another means of accomplishing this end is by the cohesion to the outside faces of the discs of layers of the same basic material of which the hard bodies of the discs are made but containing a less proportion of strength or rigidity producing ingredients and more of the inert or filler ingredients; or in place of part or all of the latter part diluent materials we may substitute an element that may be dissolved out, leaving pores and hence less resistance in a very thin layer.

In yet another means of accomplishing this end I use a solvent on the faces of discs made of one basic material until a thin layer is rendered more yielding than the original material, as for instance by laying a hard disc on an absorbent surface impregnated with a solvent until the desired thickness of yielding layer is produced.

Still another means to this end is in the configuration of the bearing surfaces of the discs. If these are made with small annular concentric ridges, having narrow bearings for contacts with the seats and guard plates or rotators, the unit pressure will be greatly increased, and through the elasticity of the material there will be a marked lessening if not total elimination of the objectionable fine leaks when the discs are new. In addition, any initial leakage that may occur past one or more of the outer ridges will be interrupted by a succession of "water grooves", the efficiency of which, through confusion of currents, is well known. Furthermore, on rotating mechanisms such discs would, because of this rotating action, and the greater unit bearing pressure, wear to a neat fit before damage would be done to the seats by cutting. It is of course obvious that when used on the old style straight port non-rotating valve mechanisms that seat-imprinting would occur more readily on discs with such configurated surfaces than on discs with plain surfaces.

When the discs are thus made with alternate small bearing ridges and grooves the grinding effects on seats, discs, and rotators or guard plates produced by sand or grit carried in suspension in the fluid forced through them is greatly lessened. Instead of being caught and held or crushed between the parts, the grains of sand or grit find repose in the grooves until the valve next opens when they are washed or blown away. Also in the case of the discs with thin layers of more yielding materials grains of sand or grit are not crushed so hard against the bearing surfaces but indent the surfaces of the discs until the valves open and wash them away.

In the accompanying drawing which illustrates the invention—

Fig. 1 is a half sectional elevation and half elevation of a side view of a pump valve embodying features of my invention;

Fig. 2 is a bottom view of the rotator;

Fig. 3 is a plan view of a disc one-half having configured surfaces and one-half plain with thin yielding surface;

Fig. 4 is a sectional, elevational view on A—B of Fig. 3, one-half having configured surfaces and one-half with thin yielding surfaces;

Fig. 5 is a plan view of half a disc showing deflectors formed in the disc itself instead of in the cavity of the rotator.

Fig. 6 is a sectional elevation through center of disc shown in Fig. 5;

Fig. 7 is a half sectional elevation and half elevation of a pump valve illustrating among other features a double dashpot between stem head and rotator;

Fig. 8 is a half sectional elevation and half elevation of a pump valve showing among other features a double dashpot between a stem head and rotator but in an inverted position to those in Fig. 7;

Fig. 9 is a double sectional elevation of a triple dashpot, one-half having the first dashpot in the stem head while the other, or right, half has the first dashpot in the rotator;

Fig. 10 is a double sectional elevation showing on the left a guard plate without deflectors and a disc with deflectors formed on its face; on the right the guard plate and disc are shown without rotative effect. Also illustrating a double dashpot on the left side and a quadruple dashpot on the right.

1 is a rotator arranged to slide on stem 2 as a guide. In the rotator is a connected compartmented cavity 3, the interrupted partitions 4 forming said connecting compartments being arranged to act as deflectors of fluid that enters them through openings 5 from ports 6 in a valve seat 7 and cause the fluid that escapes between rotator 1 and disc 8 to be ejected at an angle to radii of the rotator, and as nearly as may be in a tangential direction to its circumference.

When, through the gradually increasing motion of the discharge stroke of the pump, the fluid pressure forms under disc 8 it is transmitted through the holes 5 into cavity 3, where it acts downwardly on the portion of the disc exposed to it, and upwardly on the cavity in the rotator, causing the latter to rise off of the disc against the pressure of the spring 9. When the rotator 1 rises off of the disc 8 the fluid entering the cavity 3 through the holes 5 will escape between the top of the disc and the outer rim of the rotator, thus relieving the unit pressure in the cavity 3 and on the top of the disc 8. Simultaneously with the increase of flow through the holes 5, and the corresponding increase in upward vertical component caused by the friction of the fluid through these holes, the pressure of the fluid on the bottom of the disc is also increasing due to the accelerating motion of the pump piston or plunger. These combined forces drive the disc upwardly into contact with its bearing on the rotator. While the disc is traveling the short distance up to its bearing on the rotator it is passing through, and ejecting, a swirling film of fluid, the friction of which swirling film acting on the top face of the disc causes it to rotate slightly on its axis. When the disc is once seated against the rotator the friction holds it in its new position until the pressure of the fluid through port 6 is so far decreased as to allow the disc and rotator together to settle on the bearings of the seat 7. This will complete one cycle of the valve action and the disc will have landed on the seat in a slightly different position from that from which it started. With each cycle of the valve the disc will therefore have been rotated and thus all seat-imprinting of the disc prevented.

Another method by which I effect rotation is to make the guard plates, as 33 of Fig. 10, with a cavity, as 34, covering the hole 5 in disc 38. On the surface of disc 38 are grooves 39 positioned and formed so that they would deflect currents of fluid moving radially along the surface of the disc. The pressure of these currents on the sides of the grooves, while the disc is suspended in the fluid, will effect a turning with each cycle of the valve. The grooves 39 may be made so wide that the portions between them may be considered as ridges. We would then say the pressure on the ridges of the expelled fluid exerted the pressure causing rotation.

While it is desirable that the disc shall reliably move around or rotate slightly on its axis with each cycle of operation it is important that it should not rotate excessively, or spin. The disc 38 with deflecting fins or grooves may be used with such guard plate or rotator as 1, the rotative forces being arranged to act in opposite directions, the less powerful acting as a check or brake on the other. In viscous liquids and conditions of operation where the rotative effect is small the rotative forces of both elements may be made to act in the same direction.

Devices employing holes through discs to effect their rotation were patented by G. Clark, Feb. 1st, 1910, No. 948,132 and by Grange S. Coffin, May 25th, 1920, No. 1,341,544 but it will be observed that neither of these employ the same rotative force that I have done, both relying for this motion on the reaction of the fluid against walls of inclined holes.

Though not shown fully in Figs. 5 and 6 this type of disc, 38, may have its surface configurated as shown on the left side of Figs. 3 and 4, or its surfaces may have a thin layer of more yielding material as indicated on the right side of those two figures, and for the same objects and purposes.

It will be noted that in the center of the rotator 1 there is an annular hub 10 projecting downwardly into the disc 8. The functions of this hub are to increase the length of guide on the stem and to protect the disc from the wearing action due to sliding along the stem as the valve opens and closes. It will be seen that the bottom of this hub is formed at an acute angle 11 with the axis of the stem. The object of this is to enable the rotator to properly position the disc in case these two parts should from any cause become separated far enough to allow the hub 10 to come entirely out of the hole in disc 8. It is to be appreciated that valves are often required to operate with their stems in a horizontal, and even in an inverted, position, and it can be seen that in such cases if the rotator hub should come entirely out of the disc the valve could not function until the discs were again properly placed. This becomes very important when the discs are of metal, in which case they are much thinner and the hubs 10 are correspondingly shorter.

As has been more minutely described in the foregoing the grooves 12 and the ridges 13, shown here on half of the disc only, are for the purpose of reducing the abrasive effects of sand and grit, and for preventing fine leaks that may cause bearings to cut or score, particularly with new hard discs, and for enabling rotating discs to more quickly wear into a perfect fit where they bear on the rotators and on the seats. 14 is a thin layer on each side of the disc of more yielding substance than that of which the main body of the disc is made, the objects of which are more completely set forth hereinbefore.

I have hereinbefore explained some conditions of pump operations under which discs and rotators, or guard plates, are driven with violent force against the stem heads. The violence of this force is very variable, calling for different designs to provide against or combat. The provisions for adequately meeting these destructive forces are independent of whether the valve is equipped with a rotator or with simply a guard plate without rotative features. I have shown in Figs. 1, 7, 8, 9 and 10 designs for meeting several conditions of severity. In Fig. 1, 15 is an annular dashpot formed between the stem 2 and the spring guide 16 of the stem head. Since these valves usually operate entirely immersed in a liquid it will be observed that the rotator 1 cannot rise faster than the liquid can escape between the inside of the dashpot 15, and the outside wall of the dash 17. It will also be noticed that the more the valve opens the greater will be the resistance of escapement of liquid or fluid from the dashpot, because of the increased length of narrow space through which escapement takes place, until this escapement is entirely cut off by the surface 18 on the stem head coming in contact with surface 19 on the rotator. In light services the cushioning effect of the dashpot may be reduced by shortening the dash to some point, and shortening the spring guide. In such case the dash may be entirely outside of the dashpot when the valve was closed. An objection to this is that on the inrush of fluid when the valve was closing there might be carried small objects that would interfere with the proper operation of the valve, whereas when the dashpot and dash overlap no foreign particles could enter the dashpot that could not be ejected by the greater force produced by the discharge stroke. Furthermore, due to the fluid frequently striking the bottoms of the valves in such manner as to exert more force on one side of the disc than on the other the result is that the stem is worn away on one side by the top edge of the rotator. This soon creates so much play that the top of dash 17 becomes so eccentric as to strike or hang on the outer edge of dashpot 15, and the valve ceases to function. The overlap of the dash in the dashpot not only prevents this occurrence but offers the entire outside wall of the dashpot as additional guide and wearing surface, thus greatly increasing the life of the valve, and hence is very important.

In Fig. 7 we have practically the same construction of dashpot that is shown in Fig. 1, except that an additional annular dashpot 22 is made in the rotator around the dash of the first dashpot, and the spring guide on the stem head is formed into a dash 23 to operate in the dashpot 22. It will be observed that as the valve in this case opens only the inner dashpot is operating as a cushion. When however the rotator rises until the top of dashpot 22 is being entered by dash 23, then both dashpots will be acting as cushions. Furthermore, it will be observed that as the rotator rises farther the upper dashpot 15 will be discharging through its clearance between its outside wall and the outside wall of the dash 17, and into the dashpot 22. Hence as the valve continues to open both dashpots must now discharge through the clearance between the dash 23 and the outside wall 24 of the dashpot 22. The cushioning effect of this design may be greatly enhanced by raising the shoulder of the dash 23 to a higher position, and raising the outer wall of dashpot 22 a corresponding amount. By proper selection of proportions of dashpots, and of positions of the shoulders this design will adequately supply progressively increasing cushioning resistance to care for any reasonably severe cases and effectually prevent damaging impact of rotators or guard plates against the stem heads.

The left side of Fig. 8 and the right side of Fig. 9 illustrate modifications of the dashpots so far described. In these the inner dashpots 27 are formed in the body of the rotators, the dashes 28 being made by suitable enlargements of the stems; and the second dashpots 29 are formed in the stem head, the corresponding dashes 30 being made on the rotator. The right side of Fig. 9 illustrates the third dashpot 31 in the rotator and its corresponding dash 32 on the stem head.

The right side of Fig. 10 illustrates another design showing an additional annular dashpot positioned outside of those already described, and so arranged that all dashpots in this design must finally discharge through this outside one. In this manner it is possible by an arrangement of multiple dashpots and dashes to not only provide against the severest possible cases causing impact, and damages and expensive breakages due thereto, but to locate the amount of resistance or cushioning to the portion of the upward stroke or "lift" of the valve as may be needed for any particular conditions encountered.

Fig. 10 illustrates on its left side a guard plate 33 having a cavity 34 in its bottom face connecting with holes 5 through the disc. This guard plate may or may not have connected compartments, which may be formed by deflecting ribs or fins. The fluid acting through the holes 5 in the disc 38 causes the guard plate 33 to be raised off of the disc by the same forces and in the same manner as heretofore described, but the rotation of the disc is effected by the fluid escaping between guard plate 33 and disc 38 striking the fins, or grooves, 39 of the disc at such an angle as to produce a rotative effect. As previously explained this type of disc may also, in conjunction with the deflecting fins or grooves, have surfaces supplied with thin layers of more yielding material, or can be configured with ridges and grooves for the purposes as set forth hereinbefore.

The right side of Fig. 10 illustrates a guard plate without rotative effect, but having dashpot cushioning. It will be noted that there are no holes through the disc and no cavity in the guard plate, and hence no rotation would occur in this particular case. When conditions warrant this form can be used to advantage. The disc may be made of metal. Also the disc may often be dispensed with entirely, in which case the guard plate fulfills the functions of a disc.

While the invention has been illustrated in what are considered its best applications it may have other embodiments without departing from its spirit and is not therefore limited to the structures shown in the drawing.

What I claim is:

1. The combination with a valve seat having a central post extending therefrom, of a valve disk surrounding said post and adapted to reciprocate toward and away from said seat and rotate about said post, a guard plate surrounding said post and adapted to be reciprocated toward and away from said disk, a spring forcing said guard plate toward said disk, said guard plate and disk being adapted to be moved away from said seat by fluid pressure, a plurality of liquid dashpots comprising pots and dashes operatively connected to said guard plate, said dash pots surrounding and being at different radial distances from said post, said dashpots coming successively into operation at different portions of the stroke of the guard plate, and becoming cumulative, as the guard plate moves away from said seat, and discharging liquid successively from an inner dashpot to an outer and finally discharging it from the outer dashpot whereby the resistance and cushioning effect on the guard plate is increased as it moves away from the said seat and decreases as the guard plate is moved toward the valve seat.

2. The combination with a valve seat having a central post extending therefrom, of a valve disk surrounding said post and adapted to reciprocate toward and away from said seat and rotate about said post, a guard plate surrounding said post and adapted to be reciprocated toward and away from said disk, a spring forcing said guard plate toward said disk, said guard plate and disk being adapted to be moved away from said seat by fluid pressure, a plurality of liquid dashpots comprising pots and dashes operatively connected to said guard plate, said dashpots surrounding and being at different radial distances from said post, said dashpots in the valve closing movement of the guard plate having a partial vacuum created in them whereby the guard plate is retarded with relation to the valve disk, permitting the fluid to enter between the said guard plate and disk, thereby cushioning the impact of the guard plate on the disk when the valve closes, said dashpots successively becoming inoperative as the guard plate moves in its closing movement.

3. The combination with a valve seat having a central post extending therefrom, of a valve disk surrounding said post and adapted to reciprocate toward and away from said seat and rotate about said post, a guard plate surrounding said post and adapted to be reciprocated toward and away from said disk, a spring forcing said guard plate toward said disk, said guard plate and disk being adapted to be moved away from said seat by fluid pressure, a plurality of liquid dashpots comprising pots and dashes operatively connected to said guard plate, said dashpots surrounding and being at different radial distances from said post, said dashpots coming successively into operation at different portions of the stroke of the guard plate, and becoming cumulative, as the guard plate moves away from said seat, and discharging liquid successively from an inner dashpot to an outer and finally discharging it from the outer dashpot whereby the resistance and cushioning effect on the guard plate is increased as it moves away from the said seat and decreases as the guard plate is moved toward the valve seat and said dashpots in the valve closing movement of the guard plate having a partial vacuum created in them whereby the guard plate is retarded with relation to the valve disk, permitting the fluid to enter between the said guard plate and disk thereby cushioning the impact of the guard plate on the disk when the valve closes, said dashpots successively becoming inoperative as the guard plate moves in its closing movement, said valve disk having holes outside of any seating portion of said disk on said seat, the said holes being at right angles to the top surface of said disk.

ALFRED VARLEY SIMS.